United States Patent
Umay et al.

(10) Patent No.: US 12,164,521 B2
(45) Date of Patent: Dec. 10, 2024

(54) HETEROGENEOUS DATA PLATFORM

(71) Applicant: Microsoft Technology Licensing, LLC, Redmond, WA (US)

(72) Inventors: Mehmet Kadri Umay, Redmond, WA (US); Nayana S. Patel, Mercer Island, WA (US); Jyothsna Devi Bijjam, Redmond, WA (US); Imran Siddique, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/355,568

(22) Filed: Jun. 23, 2021

(65) Prior Publication Data

US 2022/0414105 A1  Dec. 29, 2022

(51) Int. Cl.
| | |
|---|---|
| *G06F 16/00* | (2019.01) |
| *G06F 16/22* | (2019.01) |
| *G06F 16/23* | (2019.01) |
| *G06F 16/2455* | (2019.01) |
| *G06F 16/2457* | (2019.01) |
| *G06N 20/00* | (2019.01) |

(52) U.S. Cl.
CPC ........ *G06F 16/24568* (2019.01); *G06F 16/22* (2019.01); *G06F 16/2365* (2019.01); *G06F 16/24556* (2019.01); *G06F 16/24573* (2019.01); *G06N 20/00* (2019.01)

(58) Field of Classification Search
CPC ......... G06F 16/24568; G06F 16/24573; G06F 16/22; G06F 16/24556; G06F 16/2365; G06N 20/00
See application file for complete search history.

(56) References Cited

U.S. PATENT DOCUMENTS

| | | |
|---|---|---|
| 8,510,807 B1 | 8/2013 | Peters et al. |
| 10,200,495 B2 | 2/2019 | Le Faucheur |
| 10,621,130 B1 | 4/2020 | Lockard |
| 2011/0154290 A1* | 6/2011 | Kelly ................ G06F 9/44505 717/110 |

(Continued)

OTHER PUBLICATIONS

"International Search Report & Written Opinion issued in PCT Application No. PCT/US22/029099", Mailed Date: Aug. 25, 2022, 11 Pages.

(Continued)

*Primary Examiner* — Tyler J Torgrimson

(57) ABSTRACT

In examples, streaming data is received from a data source (e.g., by an edge device associated with a data platform) and is queued and aggregated. Batch data may similarly be received from a data source. The batch data and the aggregated streaming data may be processed to generate metadata accordingly. The data and metadata may be provided to the data platform, where the metadata may be used to update an index and the data may be stored in association with the index. In some instances, the data may be stored in chunks to facilitate subsequent retrieval of the data. In response to a request for the data, the index may be used to identify relevant data, which may include data associated with batch and/or streaming data formats, thereby enabling the client device to access data having any of a variety of formats from the data platform.

12 Claims, 10 Drawing Sheets

(56) References Cited

U.S. PATENT DOCUMENTS

| | | | |
|---|---|---|---|
| 2011/0218974 A1* | 9/2011 | Amit | G06F 16/00 |
| | | | 707/693 |
| 2013/0339314 A1* | 12/2013 | Carpentier | G06F 3/0641 |
| | | | 707/E17.005 |
| 2017/0149922 A1 | 5/2017 | Le Faucheur | |
| 2019/0065545 A1 | 2/2019 | Hazel | |
| 2019/0266170 A1 | 8/2019 | Hazel | |
| 2020/0225655 A1 | 7/2020 | Cella | |
| 2021/0064016 A1 | 3/2021 | Manturana | |
| 2021/0157858 A1* | 5/2021 | Stevens | G06F 16/90335 |
| 2021/0373914 A1* | 12/2021 | Hoh | G06F 16/28 |
| 2022/0405126 A1 | 12/2022 | Umay et al. | |
| 2024/0111580 A1 | 4/2024 | Umay | |

OTHER PUBLICATIONS

"International Search Report & Written Opinion issued in PCT Application No. PCT/US22/029512", Mailed Date : Aug. 19, 2022, 14 Pages.

Reale, Andrea, "A guide to Edge IoT analytics: Internet of Things blog", Retrieved From: https://web.archive.org/web/20180123165405/https://www.ibm.com/blogs/internet-of-things/edge-iot-analytics/, Jan. 23, 2018, 11 Pages.

"Notice of Allowance Issued in U.S. Appl. No. 17/354,200", Mailed Date: Sep. 15, 2023, 10 Pages.

Non-Final Office Action mailed on Jul. 18, 2024, in U.S. Appl. No. 18/540,394, 8 pages.

* cited by examiner

HETEROGENEOUS DATA PLATFORM

BACKGROUND

Different data formats may have different associated storage, searching, and retrieval techniques. However, managing multiple formats by a data platform may introduce difficulties as a result of such format-specific idiosyncrasies. These difficulties may lead to use of multiple data platforms, increased system complexity, inefficient computing resource utilization, reduced data accessibility (e.g., in response to user search queries), and increased user frustration.

It is with respect to these and other general considerations that embodiments have been described. Also, although relatively specific problems have been discussed, it should be understood that the embodiments should not be limited to solving the specific problems identified in the background.

SUMMARY

Aspects of the present disclosure relate to a heterogeneous data platform, in which multiple data formats may be processed, stored, and/or otherwise made accessible. In examples, streaming data is received from a data source and is queued and aggregated. Batch data may similarly be received from a data source. For example, the data may be received by an edge device associated with a data platform. The batch data and the aggregated streaming data may be processed to generate metadata accordingly. The data and metadata may be provided to the data platform, where the metadata may be used to update an index and the data may be stored in association with the index. In some instances, the data may be stored in chunks to facilitate subsequent retrieval of the data.

When a request for data is received from a client device, the index may be used to identify relevant data stored by the data platform, which may include data associated with batch and/or streaming data formats. Accordingly, at least a part of the identified data may be provided in response to the request, thereby enabling the client device to access data having any of a variety of formats from the data platform.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
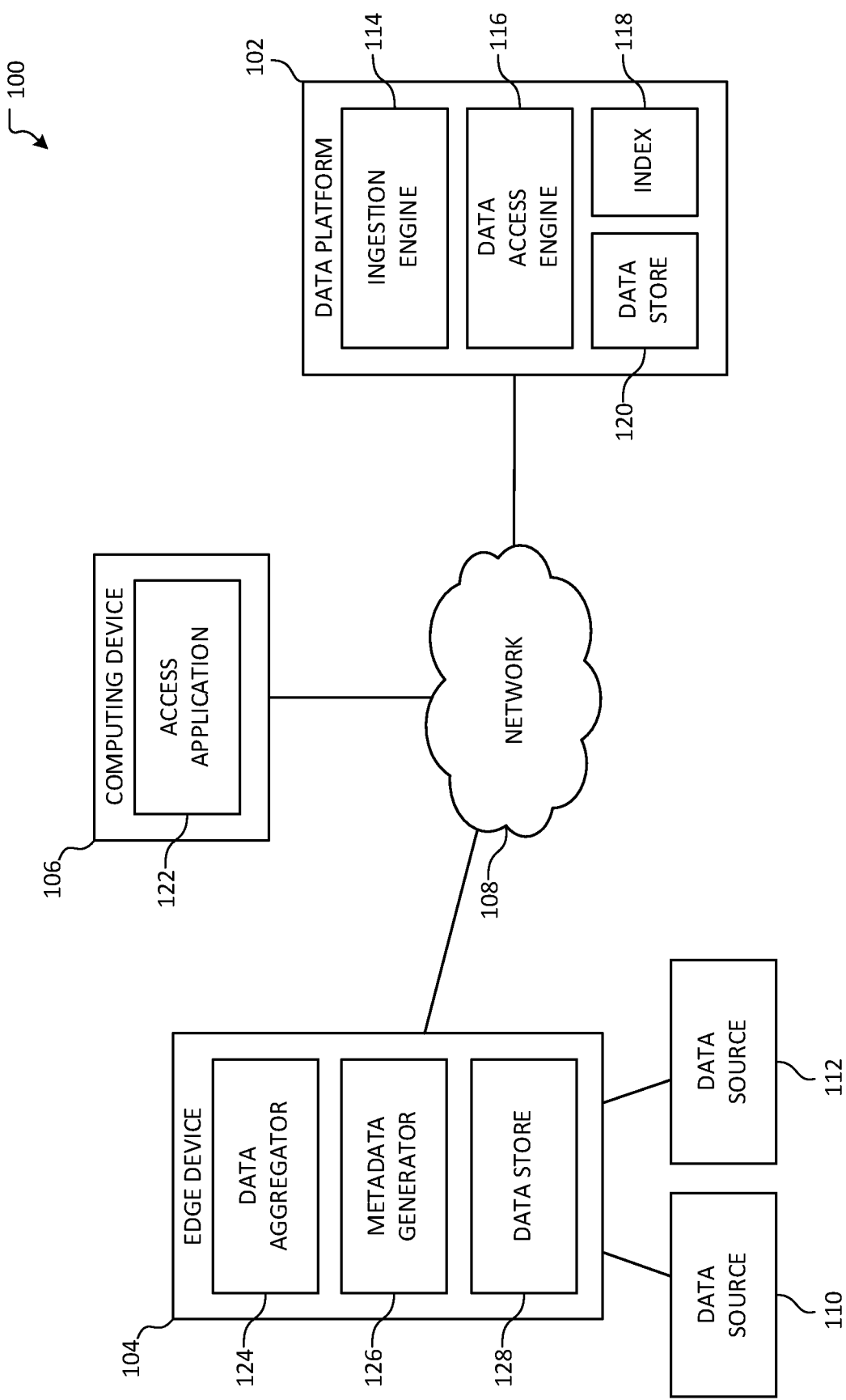
FIG. 1 illustrates an overview of an example system for aspects of the heterogeneous data platform described herein.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

In examples, there may be multiple formats of data for storage by a data platform. Example data formats include, but are not limited to, batch data and streaming data. For example, batch data may comprise discrete physical files (e.g., text documents, drone or satellite imagery, or seismic data) or n-dimensional data (e.g., as a table or in another columnar storage format), while streaming data may comprise data in a time series format (e.g., temporal data, as may be correlated with time of frequency domain data). It will be appreciated that a data format need not limit or otherwise restrict a type of data associated therewith, such that either batch data or streaming data may comprise textual data, imagery data, video data, and/or audio data, among other examples.

However, handling batch data at a data platform (e.g., according to storage, searching, and retrieval techniques) may differ from streaming data. For example, batch data may be accessible according to keywords, table names, column names, and/or row values, while streaming data may generally be accessible based on a correlation with time or frequency. Similarly, retrieving batch data that is responsive to a search query may comprise identifying and accessing a relevant row and column in a table. By contrast, identifying and providing substantially random-type access to a relevant subpart of streaming data (e.g., rather than sequential access) may be challenging and, in some examples, computationally expensive.

Accordingly, aspects of the present disclosure relate to a heterogeneous data platform, in which multiple data formats may be processed, stored, and/or otherwise made accessible. In examples, streaming data is queued and aggregated, at which point the aggregated streaming data and/or batch data may be processed to generate associated metadata. The data may be stored by the data platform in association with the generated metadata, such that the data may be retrieved at a later time based on the metadata. In examples, data may be stored in chunks by the data platform (and each chunk may have associated metadata), thereby facilitating substantially random access to subparts of the streaming data.

As a result of having both batch data and streaming data available in the heterogeneous data platform, data associated with both data formats may be retrievable for processing in conjunction with one another. For example, a machine learning model may identify and process both batch data and streaming data to classify the data accordingly. As another example, a user may identify batch data and/or streaming data that is responsive to a search query, such that both types of data may ultimately be retrieved from the data platform. Thus, aspects of the present disclosure reduce complexities associated with storing multiple data formats, offer greater discoverability of data stored in various data formats, and enable machine-generated insights that would otherwise be more computationally intensive or otherwise impossible, among other benefits.

FIG. 1 illustrates an overview of an example system 100 for aspects of the heterogeneous data platform described herein. As illustrated, system 100 comprises data platform 102, edge device 104, computing device 106, and network 108. In examples, data platform 102, edge device 104, and computing device 106 communicate via network 108, which may comprise a local area network, a wireless network, or the Internet, or any combination thereof, among other examples.

System 100 is further illustrated as comprising data source 110 and data source 112, each of which may provide data to edge device 104. In examples, data sources 110 and 112 may be any of a variety of devices, including, but not limited to, a drone, a satellite, or an Internet-of-Things (IoT) device. While system 100 depicts data sources 110 and 112 as separate from edge device 104, it will be appreciated that, in other examples, edge device 104 may comprise a data source or data may be received by edge device 104 from any of a variety of other devices. Further, while system 100 is illustrated as comprising two data sources 110 and 112, it will be appreciated that any number of data sources may be used.

In examples, data sources 110 and 112 generate or otherwise provide data having any of a variety of data formats to edge device 104. For example, data source 110 may generate data having a batch data format, while data source 112 may generate data having a streaming data format. Data formats associated with data generated by data sources 110 and 112 need not be mutually exclusive, such that data source 110 and data source 112 may generate batch data, streaming data, or any combination thereof, among other examples.

Edge device 104 is illustrated as comprising data aggregator 124, metadata generator 126, and data store 128. Data aggregator 124 obtains data from data sources 110 and 112. In examples, data aggregator may process obtained data according to an associated data format. For example, data aggregator 124 may store batch data in data store 128, such that it may be retrieved for later processing. As another example, data aggregator 124 may queue and/or aggregate streaming data, such that the aggregated streaming data is stored in data store 128 accordingly.

For instance, data aggregator 124 may generate aggregated data comprising streaming data received from data source 110 and/or data source 112. As an example, once a queue managed by data aggregator 124 comprises data that meets or exceeds the predetermined size or the predetermined amount of time has elapsed, data aggregator 124 may store the queued streaming data as aggregated data in data store 128. As another example, data aggregator 124 may batch the streaming data dynamically, for example based on identifying an anomaly in the streaming data. For instance, the streaming data may be processed according to a statistical or machine learning model, where an anomaly exceeding a predetermined threshold causes the aggregated data to be stored in data store 128. Any of a variety of additional or alternative techniques and associated criteria may be used.

The aggregated data may be stored as a file or in a database as n-dimensional data, among other examples. In some instances, the aggregated data may be stored according to a data format associated with the data source, such as Zarr, Hierarchical Data Format 5 (HDF5), Avro, or Parquet. In examples, data stored in data store 128 may be stored in compressed form and/or may be compressed prior to transmission to data platform 102. While example queueing and aggregation techniques are described, it will be appreciated that any of a variety of other techniques may be used according to aspects of the present disclosure.

Metadata generator 126 may process data from data store 128 to generate metadata according to aspects described herein. For example, metadata generator 126 may process batch data and/or aggregated streaming data of data store 128 to generate metadata. In examples, metadata generator 126 processes the data according to metadata logic, such that features of the stored data may be identified and used to generate metadata accordingly. In some instances, metadata logic may be user-definable, such that at least a part of the metadata generated by metadata generator 126 may be specific to the data generated by data sources 110 and 112. In other instances, some of the metadata logic may be default metadata logic, as may have been provided by data platform 102. Example metadata logic includes, but is not limited to, generating a location associated with the data, a timestamp, identifying an object or associated topic of the data, and/or information associated with a data source from which the data was obtained.

Metadata and associated data of edge device 104 may be obtained by data platform 102, where it may be processed by ingestion engine 114. In examples, ingestion engine 114 provides an application programming interface (API) usable by edge device 104 to provide data for storage by data platform 102. Ingestion engine 114 may store data from edge device 104 in data store 120. For example, ingestion engine 114 may store the data using a standardized schema, such that data in any of a variety of formats is stored similarly. As an example, both streaming data and batch data may be stored similarly by data platform 102. In some instances, ingestion engine 114 may generate chunks for data of edge device 104 to facilitate transmission of the data in response to a retrieval request (e.g., from computing device 106). In such an example, one or more specific chunks (e.g., response to a search query) may be identified and transmitted in response to the retrieval request accordingly. Additional examples of such aspects are described below with respect to data access engine 116.

Ingestion engine 114 may process metadata to update index 118, such that data stored by data store 120 is retrievable according to any of a variety of search criteria. In examples, the processing performed by ingestion engine 114 is user-configurable, such that indexing performed by ingestion engine 114 is specific to the data and/or metadata provided by edge device 104 and/or the queries that are expected to be processed by data platform 102. In examples, index 118 comprises associations between indexed metadata and one or more chunks of data stored by data store 120. For example, index 118 may enable data access engine 116 to identify a chunk of data responsive to a search query, regardless of a format associated with the data.

In some examples, ingestion engine 114 processes the metadata according to any of a variety of statistical and/or machine learning models, for example to identify anomalies, patterns, and/or trends. Such model processing results may similarly be stored in index 118, such that they may be used to retrieve associated data, for example in response to a search query for which the data is determined to be responsive based on an associated model processing result. Thus, data may be identified based on metadata generated by metadata generator 126 and/or associated model processing results generated by ingestion engine 114, among other examples.

Data platform 102 is further illustrated as comprising data access engine 116. As an example, data access engine 116 receives a search query (e.g., from access application 122 of computing device 106) and identifies data in data store 120 that is relevant to the search query using index 118. The identified data may be associated with streaming data and/or batch data, among any of a variety of other data formats. In examples, data access engine 116 may provide an indication of the identified data (e.g., a uniform resource locator (URL) or an associated globally unique identifier (GUID)), such that the data may be accessed by computing device 106 using the provided indication. In other examples, data access engine 116 may provide at least a part of the identified data to computing device 106.

Data access engine 116 may implement any of a variety of protocols and/or data formats with which to provide such indications and/or data, including, but not limited to, Zarr, HDF5, Avro, Parquet, Energistics Transfer Protocol (ETP), and Protocol Buffers (protobuf). Thus, data access engine 116 may act as a layer of abstraction between the data of data platform 102 (e.g., as stored in data store 120 and indexed by index 118) and any of a variety of data formats and/or transfer protocols. As a further example, the protocols and/or data formats may be extensible, such that additional protocols and/or formats may be implemented by data platform 102, for example based on the types of data stored by data platform 102 and/or the associated use cases, among other examples.

In some instances, data access engine 116 may implement read ahead and/or caching techniques, thereby increasing data access performance. For example, data access engine 116 may cache data according to historical usage patterns or depending on the type of data, among other examples. As another example, read ahead techniques may be used to identify subsequent chunks of data based on data that was previously provided by data access engine 116.

Computing device 106 is illustrated as comprising access application 122. In examples, access application 122 is usable to browse data and/or search for data of data platform 102, among other examples. User input of a search query may be received by access application 122, such that access application 122 may provide an indication of the received user input to data platform 102. As used herein, a search query may comprise any of a variety of criteria, for example relating to metadata (e.g., as may have been generated by metadata generator 126). Accordingly, data access engine 116 may use index 118 to identify data from data store 120 that is responsive to the user input.

Access application 122 may obtain at least a part of the data identified by data platform 102 to be responsive to the search query. In examples, access application 122 implements any of a variety of data formats and/or transfer protocols, such as those discussed above with respect to data access engine 116. Thus, access application 122 may provide an indication to data platform 102 as to a format and/or transfer protocol, such that data access engine 116 may provide data from data store 120 in accordance with the indicated format and/or protocol.

While examples are described in which access application 122 of computing device 106 is used by a user to access data stored by data platform 102, it will be appreciated that data may be programmatically retrieved from data platform 102 using similar techniques. Thus, any of a variety of devices and/or associated applications may access data of data platform 102.

Figure 2:
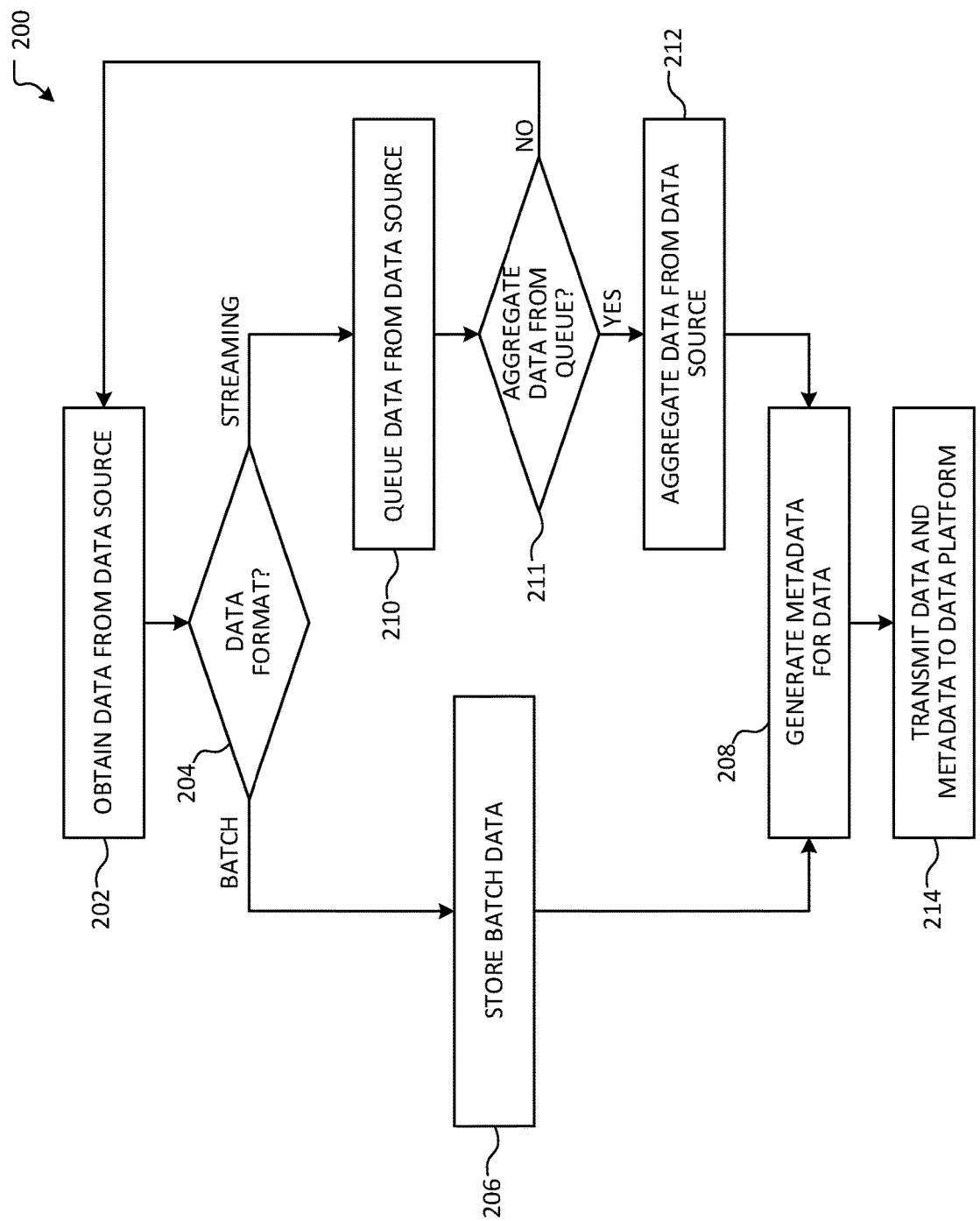
FIG. 2 illustrates an overview of an example method for processing data at an edge device according to aspects of the present disclosure.

FIG. 2 illustrates an overview of an example method 200 for processing data at an edge device according to aspects of the present disclosure. For example, method 200 may be performed by edge device 104 described above with respect to FIG. 1.

Method 200 beings at operation 202, where data is obtained from a data source, such as data source 110 or data source 112 discussed above with respect to FIG. 1. For example, the data may be received as a result of the data source transmitting the data. As another example, the data may be stored at a storage location from which it is accessed at operation 202. In examples, the data is batch data and/or streaming data, among any of a variety of other data formats. Thus, it will be appreciated that any of a variety of techniques may be used to obtain data from a data source.

At determination 204, the format of the data that was obtained from the data source is determined. For example, if it is determined that the obtained data is in a batch data format, flow branches "BATCH" to operation 206, where the data is stored. For example, the data may be stored in a data store, such as data store 128 discussed above with respect to FIG. 1. Flow progresses to operation 208, which is described below.

If, however, it is determined that the obtained data is in a streaming data format, flow instead branches "STREAMING" to operation 210, where the data from the data source is queued. For example, the streaming data may be received from the data source on a substantially on-going basis, such that the data obtained at operation 202 is queued in a buffer or other data structure.

At determination 211, it may be determined whether to aggregate data the queued data. For example, it may be determined that the queue comprises a predetermined amount of data or data from a predetermined amount of time. As another example, an anomaly may be identified within the queued data, such that it may be determined to aggregate the data from the queue accordingly at determination 211.

Thus, if it is determined not to aggregate the data from the queue, flow branches "NO" and returns to operation 202, such that flow may loop as additional streaming data is obtained from the data source. As noted above, a data source need not provide exclusively one data format, such that batch data may be processed as described above as streaming data is aggregated by operation 210. Eventually, flow may instead branch "YES" to operation 212, where data from the data source is aggregated. For example, the queued data may be aggregated and stored in a data store (e.g., data store 128 in FIG. 1) accordingly.

At operation 208, metadata is generated for the data. For example, a metadata generator such as metadata generator 126 discussed above with respect to FIG. 1 may generate metadata. In examples, operation 208 comprises generating metadata for batch data stored at operation 206 or for aggregated data generated at operation 212. For example, the aggregated data may be processed as one or more chunks at operation 208, such that metadata associated with one or more of such chunks may be generated.

As described above, the metadata may be generated according to metadata logic, where features of the data are identified and used to generate metadata accordingly. In some instances, at least a part of the metadata logic applied at operation 208 may be user-definable, such that at least a part of the metadata is specific to the data generated by the data source from which the data was obtained at operation 202. In other instances, some of the metadata logic may be default metadata logic, as may have been provided by a data platform such as data platform 102 discussed above with respect to FIG. 1.

Flow progresses to operation 214, where the data and metadata is transmitted to the data platform. For example, the data platform may provide an API with which data and associated metadata may be provided for ingestion by the data platform. In some instances, the data may be compressed and/or transmitted in chunks or as multiple files, and the associated metadata may be transmitted in a way that indicates an association between the metadata and the transmitted subparts. Thus, it will be appreciated that any of a variety of techniques may be used to transmit data to a data platform according to aspects described herein. Method 200 terminates at operation 214.

It will be appreciated that method 200 is provided as an example and, in other examples, multiple iterations of operations 204, 206, 208, 210, and 212 may be performed prior to performing operation 214. For example, operation 214 may be performed periodically or after a predetermined amount of data has been processed according to the above-listed operations. As another example, operation 214 may be performed in response to a received indication, such as an automatic indication from the data platform or a manual indication from a user's computing device.

Figure 3:
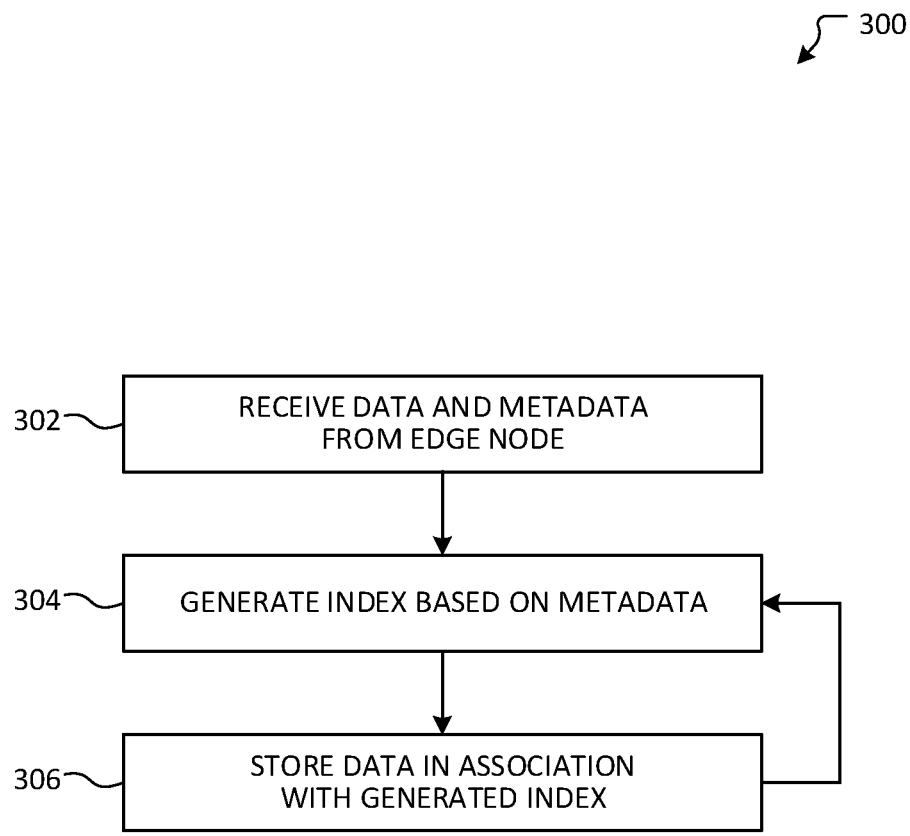
FIG. 3 illustrates an overview of an example method for storing data of an edge device by a data platform according to aspects of the present disclosure.

FIG. 3 illustrates an overview of an example method 300 for storing data of an edge device by a data platform according to aspects of the present disclosure. In examples, aspects of method 300 are performed by a data platform, such as data platform 102 discussed above with respect to FIG. 1.

Method 300 begins at operation 302, where data and metadata are received from an edge device. For example, the data and metadata may be received from an edge device similar to edge device 104 discussed above with respect to FIG. 1. The edge device may be performing a method similar to method 200 discussed above with respect to FIG. 2. In some examples, operation 302 comprises receiving data and metadata from multiple edge devices. In an example, the data and metadata may be received via an API.

At operation 304, an index is generated based on the metadata. In examples, aspects of operation 304 may be performed by an ingestion engine, such as ingestion engine 114 discussed above with respect to FIG. 1. In some instances, at least some of the processing performed at operation 304 may be user-configurable, such that the indexing is specific to the data and/or metadata that was received at operation 302. As another example, the indexing may be specific to data sources from which the data was obtained and/or the types of queries that are expected be received from computing devices. For example, the index may be generated based on a keyword analysis of words of the metadata, based on a location analysis of one or more associated geographic locations, and/or a statistical or machine learning analysis of the metadata, among other examples.

In examples, generating the index may comprise processing the metadata according to any of a variety of statistical and/or machine learning models, for example to identify anomalies, patterns, and/or trends. Such model processing results may similarly be stored in the index, such that they may be used to retrieve associated data as described above.

Flow progresses to operation 306, where the data is stored in association with the index. For example, the data may be stored in a data store (e.g., data store 120 in FIG. 1), while an index may be updated (e.g., index 118) accordingly. In some instances, storing the data may comprise generating chunks for the received data, such that later retrieval of the data may comprise retrieving at least a part of a generated chunk (e.g., as may be associated with metadata). In such instances, the index may have an association with one or more such chunks accordingly. Method 300 terminates at operation 306.

Figure 4:
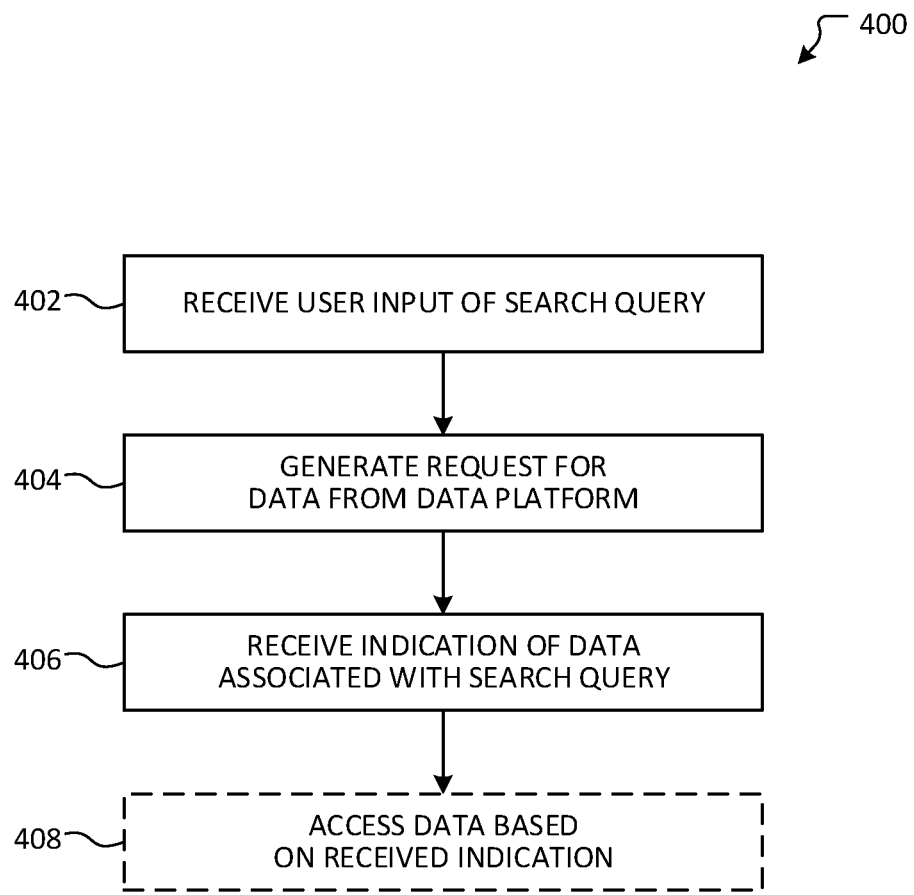
FIG. 4 illustrates an overview of an example method for requesting data associated with a search query from a data platform according to aspects of the present disclosure.

FIG. 4 illustrates an overview of an example method 400 for requesting data associated with a search query from a data platform according to aspects of the present disclosure. In examples, aspects of method 400 are performed by an access application, such as access application 122 of computing device 106 discussed above with respect to FIG. 1.

Method 400 begins at operation 402, where user input of a search query is received. In examples, the user input may be received as a typed search query and/or as one or more selections from a set of filters. As a further example, a user may select a search query from a set of saved search queries. Thus, it will be appreciated that any of a variety of techniques may be used to input a search query for use with aspects of the present disclosure.

Flow progresses to operation 404, where a request for data from a data platform is generated. For example, the request may be generated according to a specific protocol and/or data format. In some examples, the request may similarly comprise an indication as to a protocol with which the data is to be accessed and/or a format in which the data should be provided.

Accordingly, at operation 406, an indication of data associated with the search query is received. In some instances, the indication comprises data that is responsive to the search query that was received as user input at operation 402. In other examples, the indication comprises information usable to retrieve the data that is responsive to the search query. For example, the data may be received according to a format that was indicated in the request that was generated at operation 404. Thus, in instances where the indication comprises the data, method 400 may terminate at operation 406.

In other instances, flow progresses to operation 408, where the data is accessed based on the indication that was received at operation 406. For example, operation 408 may comprise communicating with the data platform at a specific URL or according to a protocol using information that was received at operation 406. In some examples, the data platform may provide an indication for data stored elsewhere, such that operation 408 comprises communication with a device other than the device from which the indication was received at operation 406. Method 400 terminates at operation 408.

Figure 5:
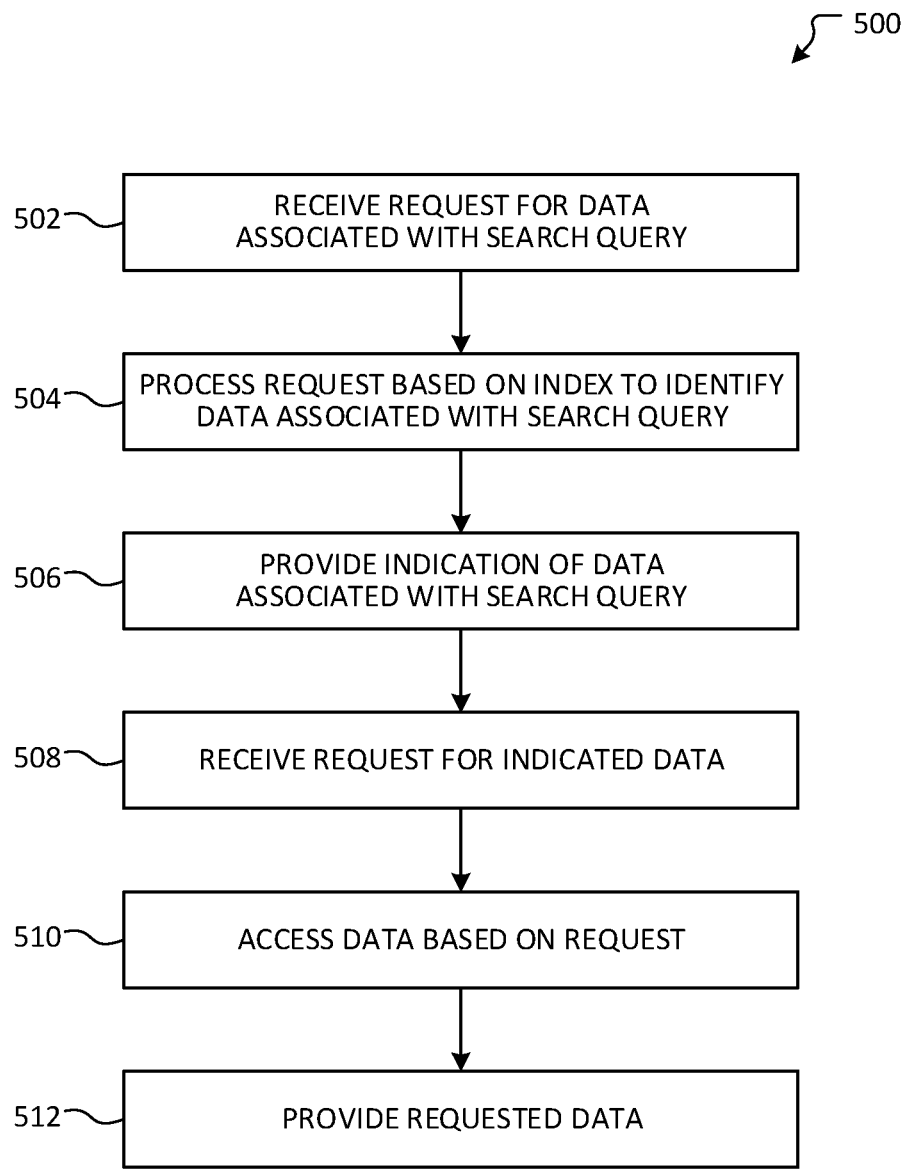
FIG. 5 illustrates an overview of an example method for processing a request for data by a data platform according to aspects of the present disclosure.

FIG. 5 illustrates an overview of an example method 500 for processing a request for data by a data platform according to aspects of the present disclosure. In examples, aspects of method 500 are performed by data access engine, such as data access engine 116 of data platform 102 discussed above with respect to FIG. 1.

Method 500 begins at operation 502, where a request for data associated with a search query is received. For example, the request may be received from an access application, such as access application 122 discussed above with respect to FIG. 1. The access application may perform aspects of operation 402 of method 400 discussed above with respect to FIG. 4. While example interactions are described with respect to user input, it will be appreciated that similar techniques may be used in instances where a data platform is programmatically accessed, among other examples.

At operation 504, the request is processed based on an index to identify data associated with the search query accordingly. For example, the index (e.g., index 118 discussed above with respect to FIG. 1) may have been generated based on metadata associated with data in a data store (e.g., data store 120), such that metadata that is relevant to the search query is identified at operation 504. Accordingly, the index may comprise an association between the identified metadata and data of the data store, such as one or more chunks according to aspects described herein.

Flow progresses to operation 506, where an indication of the data identified at operation 506 is provided. For example, the indication may be usable to retrieve the identified data, such as a URL or GUID associated with the data. In other examples, operation 506 may comprise providing at least a part of the identified data, for example a summary or other subpart of the identified data to enable a user to determine whether to request the data based on the provided subpart. The indication may be received by the user's computing device performing aspects of operation 406 discussed above with respect to method 400 in FIG. 4. In instances where the indication comprises the identified data, method 400 may terminate at operation 506. As another example, the identified data may be stored in a different container and/or by a different device of a data platform, such that operations 508-512 are performed by a different device than those that performed operations 502-506.

At operation 508, a request is received for the data that was indicated at operation 506. For example, the request may be received from the device from which the request at operation 502 was received. In examples, the request comprises a URL, a GUID, or other identifier usable to retrieve the data that was identified at operation 504. In another example, the request may comprise an indication of a data format and/or protocol that should be used to provide the request.

Flow progresses to operation 510, where the data is accessed based on the request. For example, the data may be accessed according to an identifier included in the request. In some instances, operation 510 comprises accessing one or more chunks of data associated with the request. The data may be accessed from a data store or from a cache, as may be the case when the data was previously requested or was cached as a result of the read-ahead caching techniques described above. Thus, it will be appreciated that any of a variety of techniques may be used to access data associated with the request that was received at operation 508.

At operation 512, the requested data is provided in response to the received request. For example, the data may be provided according to a specific format and/or protocol (e.g., as may have been indicated by the request received at operation 508). As noted above, operations 508-512 may be performed by a different device than the device that performed operations 502-506. In other examples, operations 508-512 may be performed multiple times, for example to access multiple chunks of data as may have been indicated at operation 506. Method 500 terminates at operation 512.

FIGS. 6-9 and the associated descriptions provide a discussion of a variety of operating environments in which aspects of the disclosure may be practiced. However, the devices and systems illustrated and discussed with respect to FIGS. 6-9 are for purposes of example and illustration and are not limiting of a vast number of computing device configurations that may be utilized for practicing aspects of the disclosure, described herein.

Figure 6:
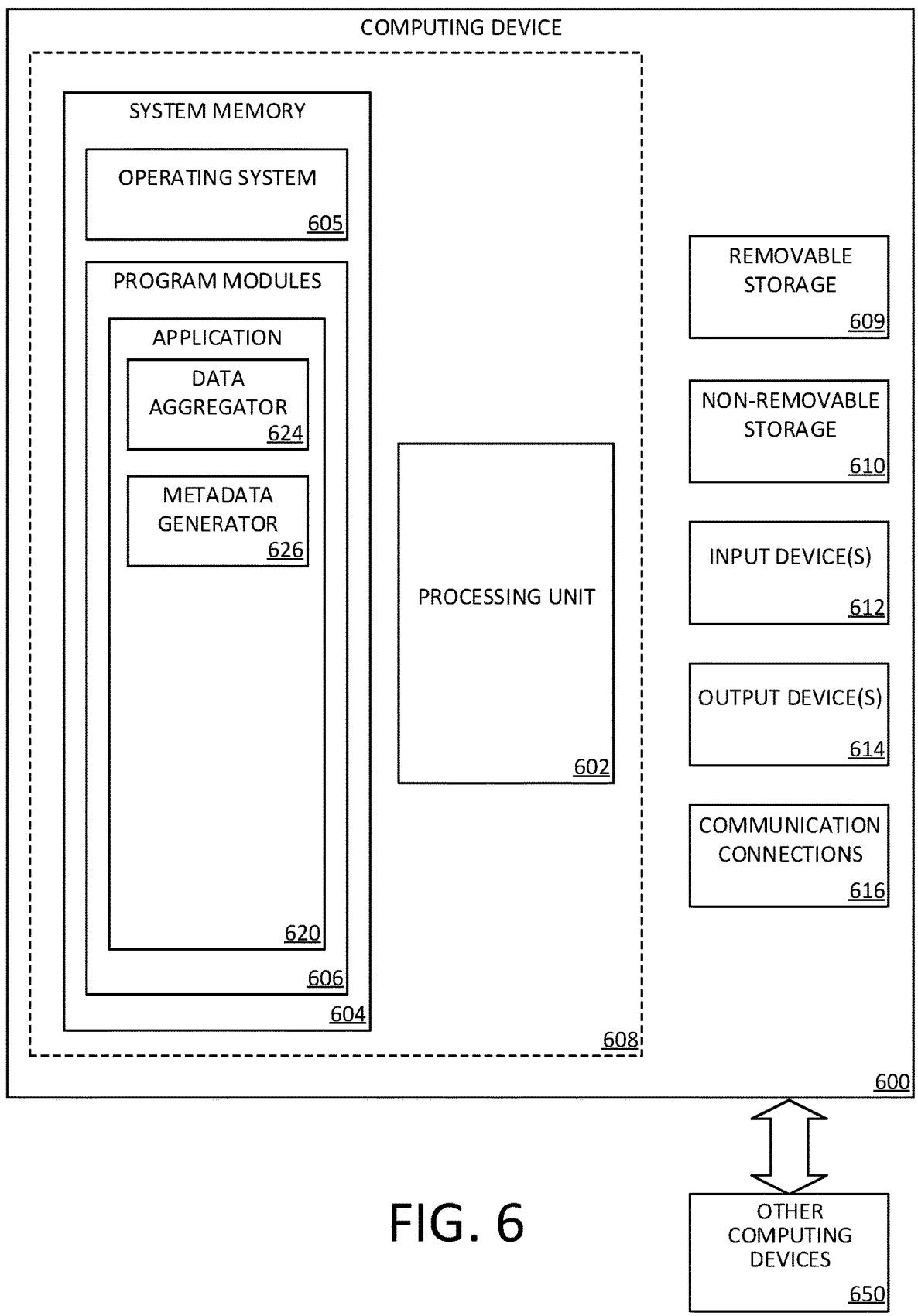
FIG. 6 is a block diagram illustrating example physical components of a computing device with which aspects of the disclosure may be practiced.

FIG. 6 is a block diagram illustrating physical components (e.g., hardware) of a computing device 600 with which aspects of the disclosure may be practiced. The computing device components described below may be suitable for the computing devices described above, including devices 102, 104, and/or 106 discussed above with respect to FIG. 1. In a basic configuration, the computing device 600 may include at least one processing unit 602 and a system memory 604. Depending on the configuration and type of computing device, the system memory 604 may comprise, but is not limited to, volatile storage (e.g., random access memory), non-volatile storage (e.g., read-only memory), flash memory, or any combination of such memories.

The system memory 604 may include an operating system 605 and one or more program modules 606 suitable for running software application 620, such as one or more components supported by the systems described herein. As examples, system memory 604 may store context determination engine 624 and input processor 626. The operating system 605, for example, may be suitable for controlling the operation of the computing device 600.

Furthermore, embodiments of the disclosure may be practiced in conjunction with a graphics library, other operating systems, or any other application program and is not limited to any particular application or system. This basic configuration is illustrated in FIG. 6 by those components within a dashed line 608. The computing device 600 may have additional features or functionality. For example, the computing device 600 may also include additional data storage devices (removable and/or non-removable) such as, for example, magnetic disks, optical disks, or tape. Such additional storage is illustrated in FIG. 6 by a removable storage device 609 and a non-removable storage device 610.

As stated above, a number of program modules and data files may be stored in the system memory 604. While executing on the processing unit 602, the program modules 606 (e.g., application 620) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 600 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 600 may also have one or more input device(s) 612 such as a keyboard, a mouse, a pen, a sound or voice input device, a touch or swipe input device, etc. The output device(s) 614 such as a display, speakers, a printer, etc. may also be included. The aforementioned devices are examples and others may be used. The computing device 600 may include one or more communication connections 616 allowing communications with other computing devices 650. Examples of suitable communication connections 616 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 604, the removable storage device 609, and the non-removable storage device 610 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. Any such computer storage media may be part of the computing device 600. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 7A:
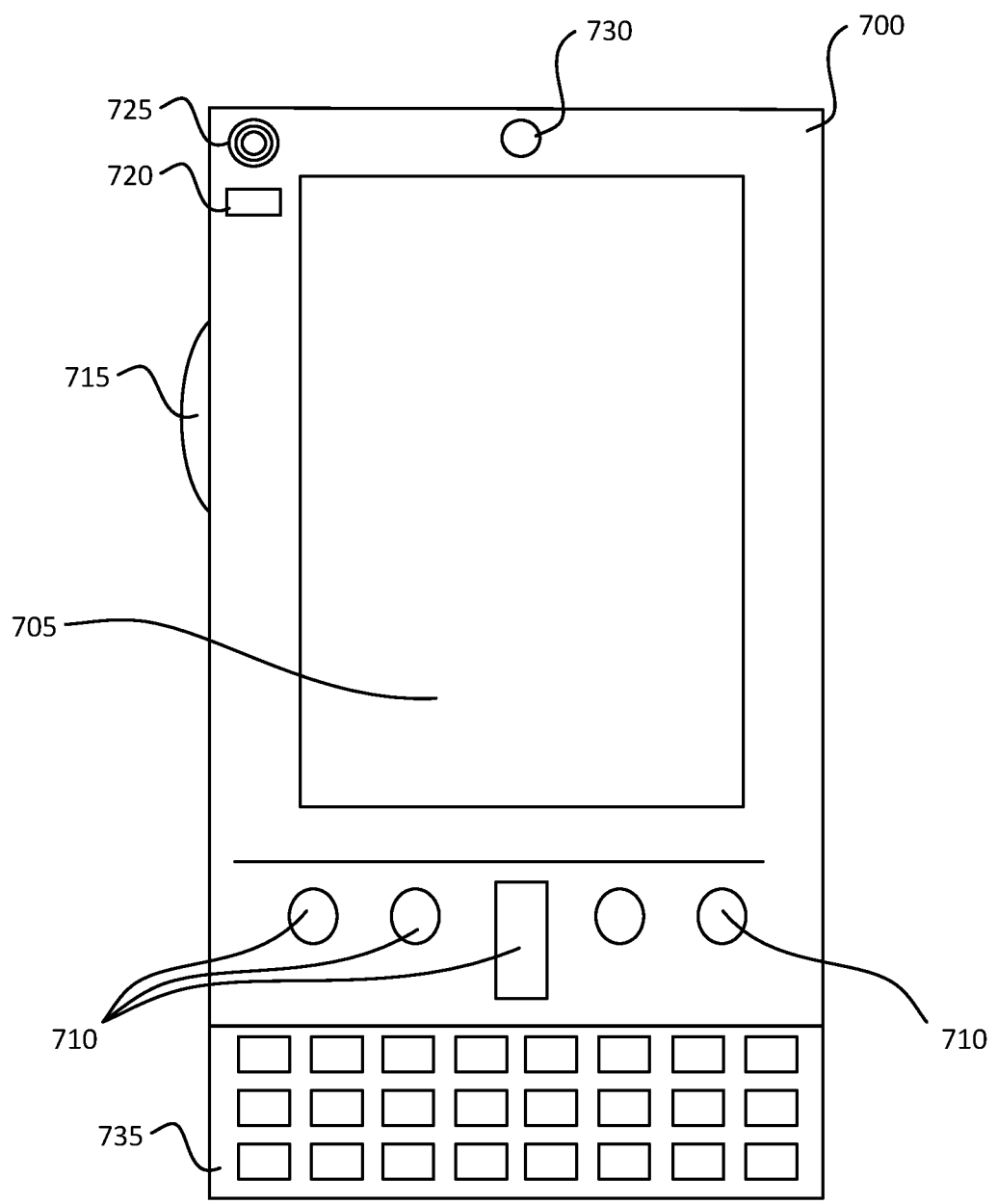
FIGS. 7A and 7B are simplified block diagrams of a mobile computing device with which aspects of the present disclosure may be practiced.
Figure 7B:
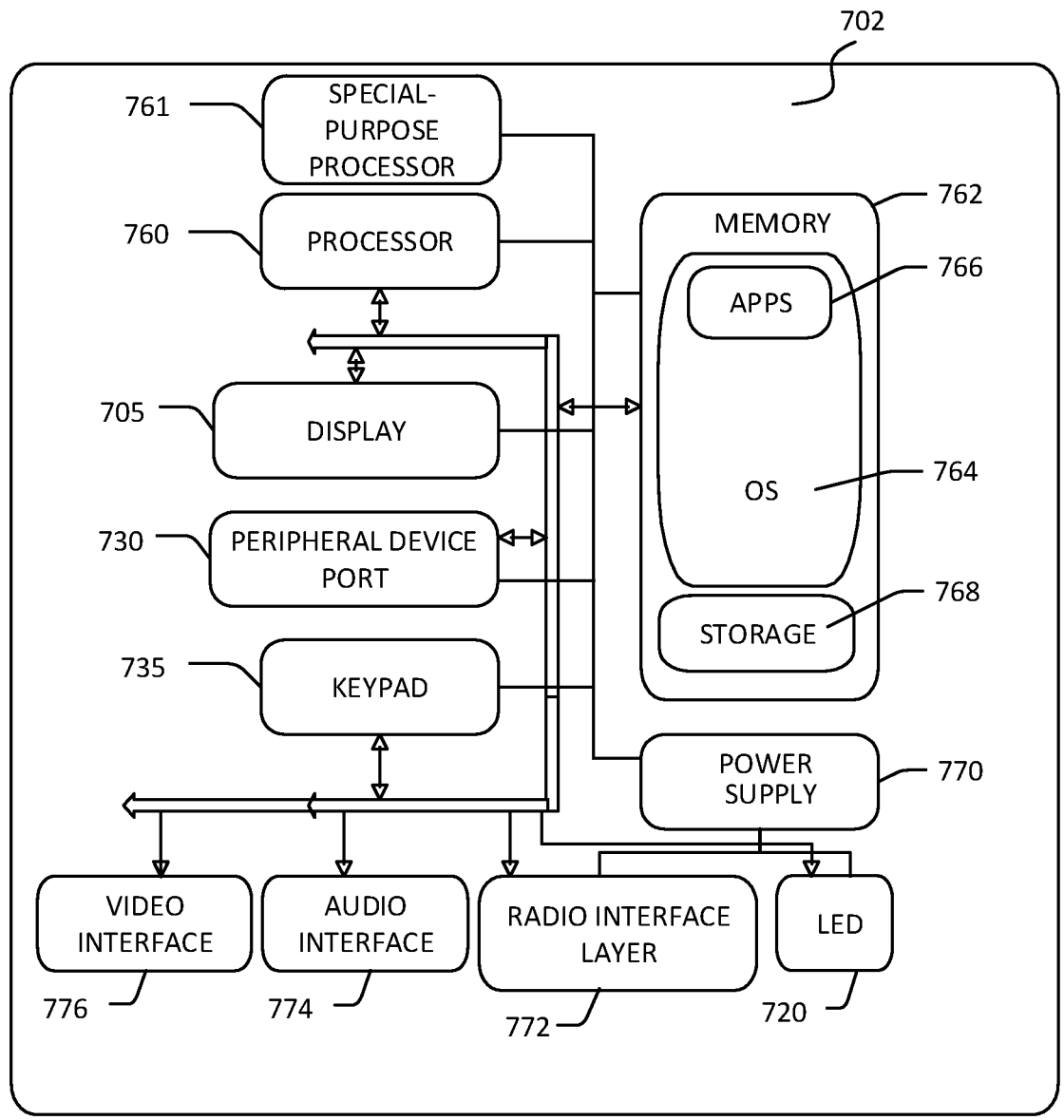

FIGS. 7A and 7B illustrate a mobile computing device 700, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 7A, one aspect of a mobile computing device 700 for implementing the aspects is illustrated. In a basic configuration, the mobile computing device 700 is a handheld computer having both input elements and output elements. The mobile computing device 700 typically includes a display 705 and one or more input buttons 710 that allow the user to enter information into the mobile computing device 700. The display 705 of the mobile computing device 700 may also function as an input device (e.g., a touch screen display).

If included, an optional side input element 715 allows further user input. The side input element 715 may be a rotary switch, a button, or any other type of manual input element. In alternative aspects, mobile computing device 700 may incorporate more or less input elements. For example, the display 705 may not be a touch screen in some embodiments.

In yet another alternative embodiment, the mobile computing device 700 is a portable phone system, such as a cellular phone. The mobile computing device 700 may also include an optional keypad 735. Optional keypad 735 may be a physical keypad or a "soft" keypad generated on the touch screen display.

In various embodiments, the output elements include the display 705 for showing a graphical user interface (GUI), a visual indicator 720 (e.g., a light emitting diode), and/or an audio transducer 725 (e.g., a speaker). In some aspects, the mobile computing device 700 incorporates a vibration transducer for providing the user with tactile feedback. In yet another aspect, the mobile computing device 700 incorporates input and/or output ports, such as an audio input (e.g., a microphone jack), an audio output (e.g., a headphone jack), and a video output (e.g., a HDMI port) for sending signals to or receiving signals from an external device.

FIG. 7B is a block diagram illustrating the architecture of one aspect of a mobile computing device. That is, the mobile computing device 700 can incorporate a system (e.g., an architecture) 702 to implement some aspects. In one embodiment, the system 702 is implemented as a "smart phone" capable of running one or more applications (e.g., browser, e-mail, calendaring, contact managers, messaging clients, games, and media clients/players). In some aspects, the system 702 is integrated as a computing device, such as an integrated personal digital assistant (PDA) and wireless phone.

One or more application programs 766 may be loaded into the memory 762 and run on or in association with the operating system 764. Examples of the application programs include phone dialer programs, e-mail programs, personal information management (PIM) programs, word processing programs, spreadsheet programs, Internet browser programs, messaging programs, and so forth. The system 702 also includes a non-volatile storage area 768 within the memory 762. The non-volatile storage area 768 may be used to store persistent information that should not be lost if the system 702 is powered down. The application programs 766 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the mobile computing device 700 described herein (e.g., search engine, extractor module, relevancy ranking module, answer scoring module, etc.).

The system 702 has a power supply 770, which may be implemented as one or more batteries. The power supply 770 might further include an external power source, such as an AC adapter or a powered docking cradle that supplements or recharges the batteries.

The system 702 may also include a radio interface layer 772 that performs the function of transmitting and receiving radio frequency communications. The radio interface layer 772 facilitates wireless connectivity between the system 702 and the "outside world," via a communications carrier or service provider. Transmissions to and from the radio interface layer 772 are conducted under control of the operating system 764. In other words, communications received by the radio interface layer 772 may be disseminated to the application programs 766 via the operating system 764, and vice versa.

The visual indicator 720 may be used to provide visual notifications, and/or an audio interface 774 may be used for producing audible notifications via the audio transducer 725. In the illustrated embodiment, the visual indicator 720 is a light emitting diode (LED) and the audio transducer 725 is a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 725, the audio interface 774 may also be coupled to a microphone to receive audible input, such as to facilitate a telephone conversation. In accordance with embodiments of the present disclosure, the microphone may also serve as an audio sensor to facilitate control of notifications, as will be described below. The system 702 may further include a video interface 776 that enables an operation of an on-board camera 730 to record still images, video stream, and the like.

A mobile computing device 700 implementing the system 702 may have additional features or functionality. For example, the mobile computing device 700 may also include additional data storage devices (removable and/or non-removable) such as, magnetic disks, optical disks, or tape. Such additional storage is illustrated in FIG. 7B by the non-volatile storage area 768.

Data/information generated or captured by the mobile computing device 700 and stored via the system 702 may be stored locally on the mobile computing device 700, as described above, or the data may be stored on any number of storage media that may be accessed by the device via the radio interface layer 772 or via a wired connection between the mobile computing device 700 and a separate computing device associated with the mobile computing device 700, for example, a server computer in a distributed computing network, such as the Internet. As should be appreciated such data/information may be accessed via the mobile computing device 700 via the radio interface layer 772 or via a distributed computing network. Similarly, such data/information may be readily transferred between computing devices for storage and use according to well-known data/information transfer and storage means, including electronic mail and collaborative data/information sharing systems.

Figure 8:
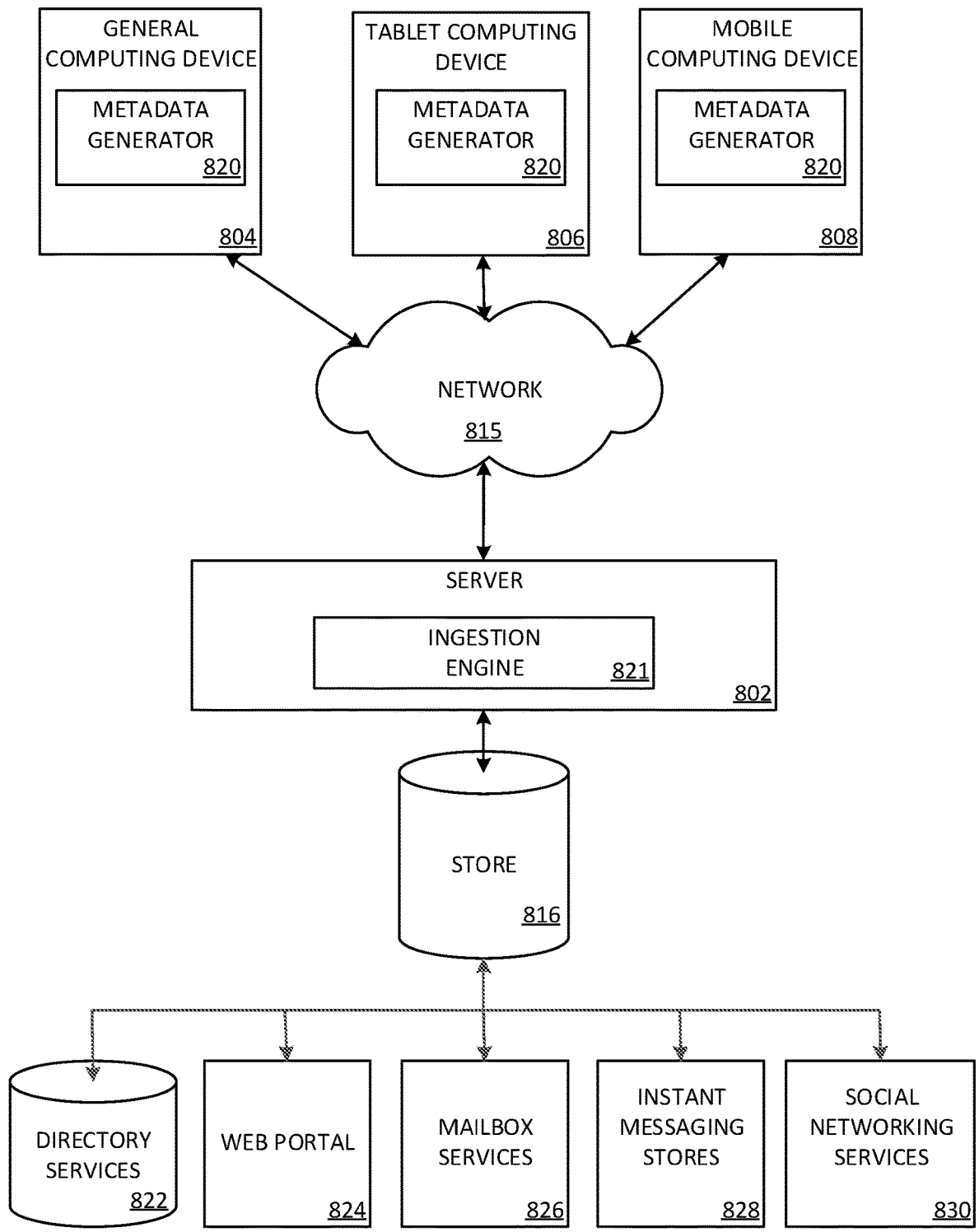
FIG. 8 is a simplified block diagram of a distributed computing system in which aspects of the present disclosure may be practiced.

FIG. 8 illustrates one aspect of the architecture of a system for processing data received at a computing system from a remote source, such as a personal computer 804, tablet computing device 806, or mobile computing device 808, as described above. Content displayed at server device 802 may be stored in different communication channels or other storage types. For example, various documents may be stored using a directory service 822, a web portal 824, a mailbox service 826, an instant messaging store 828, or a social networking site 830.

A metadata generator 820 may be employed by a client (e.g., an edge device similar to edge device 104 discussed above with respect to FIG. 1) that communicates with server device 802, and/or ingestion engine 821 may be employed by server device 802. The server device 802 may provide data to and from a client computing device such as a personal computer 804, a tablet computing device 806 and/or a mobile computing device 808 (e.g., a smart phone) through a network 815. By way of example, the computer system described above may be embodied in a personal computer 804, a tablet computing device 806 and/or a mobile computing device 808 (e.g., a smart phone). Any of these embodiments of the computing devices may obtain content from the store 816, in addition to receiving graphical data useable to be either pre-processed at a graphic-originating system, or post-processed at a receiving computing system.

Figure 9:
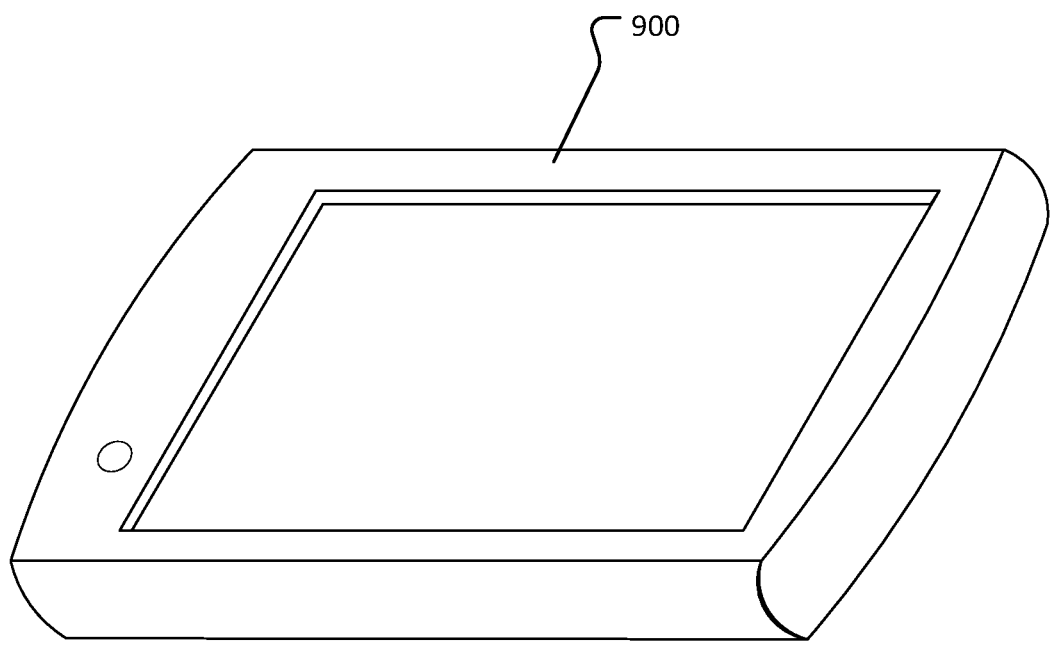
FIG. 9 illustrates a tablet computing device for executing one or more aspects of the present disclosure.

FIG. 9 illustrates an exemplary tablet computing device 900 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As will be understood from the foregoing disclosure, one aspect of the technology relates to a system comprising: at least one processor; and memory storing instructions that, when executed by the at least one processor, causes the system to perform a set of operations. The set of operations comprises: receiving, from a data source, streaming data; queuing the received streaming data in a queue; based on determining to aggregate data from the queue, generating aggregated streaming data from the queue; processing the aggregated streaming data according to metadata logic to generate metadata associated with the aggregated data; and transmitting the aggregated streaming data and the generated metadata to a data platform. In an example, the data source is a first data source and the set of operations further comprises: receiving, from a second data source, batch data; and processing the batch data to generate metadata associated with the batch data. In another example, transmitting the aggregated streaming data and the generated metadata further comprises transmitting the batch data and the generated metadata associated with the batch data. In a further example, the first data source is the second data source. In yet another example, determining to aggregate data from the queue comprises at least one of: determining the queue comprises a predetermined amount of data; determining the queue comprises data associated with a predetermined amount of time; identifying an anomaly using a machine learning model; or identifying an anomaly using a statistical model. In a further still example, a first part of the metadata logic is default metadata logic associated with the data platform; and a second part of the metadata logic is user-defined metadata logic. In an example, transmitting the aggregated streaming data and the generated metadata to the data platform comprises using an application programming of the interface to transmit at least a part of the aggregated streaming data in association with generated metadata.

In another aspect, the technology relates to a method for ingesting data from an edge device associated with a data platform. The method comprises: receiving, from the edge device, data and metadata associated with the data, wherein: a first part of the data is associated with a streaming data format; and a second part of the data is associated with a batch data format; processing the metadata to update an index of the data platform to comprise an association between a part of the metadata and a part of the data; and storing the received data in a data store of the data platform. In an example, the association between the part of the metadata and the part of the data comprises an indication of the data store in which the data is stored. In another example, processing the metadata comprises generating a model processing result based on the received metadata using at least one of a machine learning model or a statistical model; and the index is updated to further comprise the model processing result. In a further example, storing the received data comprises storing the second part of the data associated with the batch data format as a plurality of chunks in the data store. In a yet another example, the method further comprises: receiving, from a client device, a request for data from the data platform; processing, using the index, the request to identify data that is responsive to the request, wherein the identified data comprises data associated with the streaming data format and data associated with the batch data format; and providing, in response to the request, an indication of the identified data. In a further still example, the identified data comprises a chunk of data associated with the streaming data format; and the indication of the identified data comprises an indication of the chunk.

In a further aspect, the technology relates to a method for processing data for ingestion by a data platform. The method comprises: receiving, from a data source, streaming data; queuing the received streaming data in a queue; based on determining to aggregate data from the queue, generating aggregated streaming data from the queue; processing the aggregated streaming data according to metadata logic to generate metadata associated with the aggregated data; and transmitting the aggregated streaming data and the generated metadata to the data platform. In an example, the data source is a first data source and the method further comprises: receiving, from a second data source, batch data; and processing the batch data to generate metadata associated with the batch data. In another example, transmitting the aggregated streaming data and the generated metadata further comprises transmitting the batch data and the generated metadata associated with the batch data. In a further example, the first data source is the second data source. In yet another example, determining to aggregate data from the queue comprises at least one of: determining the queue comprises a predetermined amount of data; determining the queue comprises data associated with a predetermined amount of time; identifying an anomaly using a machine learning model; or identifying an anomaly using a statistical model. In a further still example, a first part of the metadata logic is default metadata logic associated with the data platform; and a second part of the metadata logic is user-defined metadata logic. In an example, transmitting the aggregated streaming data and the generated metadata to the data platform comprises using an application programming of the interface to transmit at least a part of the aggregated streaming data in association with generated metadata.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use claimed aspects of the disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
   at least one processor; and
   memory storing instructions that, when executed by the at least one processor, causes the system to perform a set of operations, the set of operations comprising:
   receiving, from a first data source, streaming data;
   queuing the received streaming data in a queue;
   determining to aggregate data from the queue;
     wherein determining to aggregate data from the queue comprises at least one identifying an anomaly using a machine learning model;
   based on determining to aggregate data from the queue, generating aggregated streaming data from the queue, wherein the aggregated data comprises the streaming data received from the first data source;
   based on determining the anomaly exceeds a predetermined threshold, storing the aggregated data in a data store;
   processing the aggregated streaming data according to metadata logic, to generate metadata associated with a chunk of the aggregated streaming data;
   receiving, from a second data source, batch data, wherein the batch data comprises at least one of physical files or n-dimensional data saved on the data store;
   processing the batch data to generate metadata associated with the batch data; and
   transmitting the aggregated streaming data, the generated metadata associated with the chunk of aggregated streaming data, the batch data, and the metadata associated with the batch data to a data platform.

2. The system of claim 1, wherein transmitting the aggregated streaming data and the generated metadata further comprises transmitting the batch data and the generated metadata associated with the batch data.

3. The system of claim 1, wherein the first data source and the second data source are the same computing device.

4. The system of claim 1, wherein:
a first part of the metadata logic is default metadata logic associated with the data platform; and
a second part of the metadata logic is user-defined metadata logic.

5. The system of claim 1, wherein transmitting the aggregated streaming data and the generated metadata to the data platform comprises using an application programming of the interface to transmit at least a part of the aggregated streaming data in association with generated metadata.

6. A method for processing data for ingestion by a data platform, the method comprising:
receiving, from a first data source, streaming data;
queuing the received streaming data in a queue;
determining to aggregate data from the queue;
wherein determining to aggregate data from the queue comprises at least identifying an anomaly using a machine learning model;
based on determining to aggregate data from the queue, generating aggregated streaming data from the queue, wherein the aggregate data comprises the streaming data received from the first data source;
based on determining the anomaly exceeds a predetermined threshold, storing the aggregated data in a data store;
processing the aggregated streaming data, according to metadata logic, to generate metadata associated with a chunk of the aggregated streaming data;
receiving, from a second data source, batch data, wherein the batch data comprises at least one of physical files or n-dimensional data saved on the data store;
processing the batch data to generate metadata associated with the batch data; and
transmitting the aggregated streaming data, the generated metadata associated with the chunk of aggregated streaming data, the batch data, and the metadata associated with the batch data to the data platform.

7. The method of claim 6, wherein transmitting the aggregated streaming data and the generated metadata further comprises transmitting the batch data and the generated metadata associated with the batch data.

8. The method of claim 6, wherein the first data source and the second data source are the same computing device.

9. The method of claim 6, wherein determining to aggregate data from the queue comprises at least one of:
determining the queue comprises a predetermined amount of data;
determining the queue comprises data associated with a predetermined amount of time;
identifying an anomaly using a machine learning model; or
identifying an anomaly using a statistical model.

10. The method of claim 9, wherein, when the anomaly exceeds a predetermined threshold, the aggregated data is stored in a data store.

11. The method of claim 6, wherein:
a first part of the metadata logic is default metadata logic associated with the data platform; and
a second part of the metadata logic is user-defined metadata logic.

12. The method of claim 6, wherein transmitting the aggregated streaming data and the generated metadata to the data platform comprises using an application programming of the interface to transmit at least a part of the aggregated streaming data in association with generated metadata.

* * * * *